(12) United States Patent
Miyaura

(10) Patent No.: US 6,422,667 B2
(45) Date of Patent: Jul. 23, 2002

(54) LINK-AND-PIN FIXING STRUCTURE FOR A CRAWLER CHAIN

(75) Inventor: Seiji Miyaura, Oosaka-fu (JP)

(73) Assignee: Komatsu Limited, Tokyo (JP)

( * ) Notice: Subject to any disclaimer, the term of this patent is extended or adjusted under 35 U.S.C. 154(b) by 66 days.

(21) Appl. No.: 09/746,040

(22) Filed: Dec. 22, 2000

(51) Int. Cl.⁷ ............................................. B62D 55/21
(52) U.S. Cl. ...................................... 305/202; 403/317
(58) Field of Search ........................... 305/59, 202, 203, 305/204, 200, 201; 403/155, 317

(56) References Cited

U.S. PATENT DOCUMENTS

| | | |
|---|---|---|
| 1,507,757 A | 9/1924 | Savage |
| 2,141,771 A | 12/1938 | Sparling |
| 4,182,578 A * | 1/1980 | Livesay et al. ............. 403/317 |
| 4,391,544 A * | 7/1983 | Cadwallader ............... 403/155 |
| 4,618,190 A | 10/1986 | Garman et al. |
| 4,630,958 A | 12/1986 | McCallister |
| 4,639,995 A | 2/1987 | Garman et al. |
| 5,069,509 A * | 12/1991 | Johnson et al. ............. 305/202 |
| 5,257,858 A * | 11/1993 | Taft ........................... 305/202 |

FOREIGN PATENT DOCUMENTS

| | | |
|---|---|---|
| DE | 24 50 767 | 4/1976 |
| GB | 2 066 904 A | 7/1981 |
| JP | 46-564 | 1/1971 |

* cited by examiner

*Primary Examiner*—Russell D. Stormer
(74) *Attorney, Agent, or Firm*—Bell, Boyd & Lloyd LLC

(57) ABSTRACT

A fitting space having an annular opening, in which an elastic ring whose diameter of a section is D is to be fitted, is formed between a pin-press-fit hole of a link and an exposed end portion of a pin. A link inner wall face and a pin outer peripheral face in the fitting space are formed with tapered faces whose diameters decrease as they go toward an inmost of the fitting space at angles $\alpha$ and $\beta$ ($\alpha > \beta$) with respect to the axial line of the pin, respectively. The elastic ring contacts with the respective tapered faces in the fitting space at the angles $\alpha$ and $\beta$ with respect to a perpendicular passing a center of its section. Dimensions d1 and d2 between contact points at the respective tapered faces and a horizontal line passing the center of the section of the elastic ring, the diameter D of the section of the elastic ring, and the angles $\alpha$ and $\beta$ have a relation of $\alpha > \beta$, $D > d1 + d2$ (where $d1 = D/2 \cdot \cos\alpha$, $d2 = D/2 \cdot \cos\beta$). Therefore, the links and the pin can be connected to each other securely and firmly with a sufficient holding force to the pin in the axial direction. Thus, assembly of the links and the pin can be carried out easily at a low cost.

4 Claims, 5 Drawing Sheets

LINK-AND-PIN FIXING STRUCTURE FOR A CRAWLER CHAIN

BACKGROUND OF THE INVENTION

1. Field of the Invention

The present invention relates to a structure for fixing links and pins of a traveling crawler chain to be used in a crawler-type vehicle. More particularly, it relates to a link-and-pin fixing structure for a crawler chain, which enables the links and the pins to be fixed to each other easily and firmly and in which the links and pins can be assembled securely at a low cost.

2. Description of the Related Art

Plural ground-contact track shoes are mounted to an endless link chain with mounting bolts in a traveling crawler chain of a crawler-type vehicle of construction machine such as a bulldozer or a hydraulic shovel. For assembling this link chain, pins for connecting links, which are press-fitted into cylindrical bushes respectively, are press-fitted into the respective end portions of right and left links successively. The cylindrical bushes have their respective both ends exposed outside. The end portions of the respective links are coupled with each other with pins in an articulated manner such that they are part from each other. The end portion of each link is provided with a lubricant-sealing member and its crush-preventing spacer for preventing internal abrasion between the pin and the bush. Lubricant reserved within the pin is supplied to between the pin and the bush.

Generally, the aforementioned link chain is used for travelling on hard, soft ground composed of soil, sand, gravel or the like or hard, soft slope ground of such. Therefore, the link chain interferes with outside obstacles, rocks or the like. Thus, the respective links tend to receive an external force in their axial direction through a flange or the like of a lower roller of the vehicle. Additionally, end faces of the pins also tend to receive an external force or the like in their axial direction through a roller guard or the like of the vehicle body, so that the pin becomes loose easily. If the pin is held with a small force, it may start or come out. Thus, the lubricant-sealing member and the crush-preventing spacer of the sealing member disposed at the end portions of the links are easily deformed, starts to be displaced or damaged.

If the sealing member or the crush-preventing spacer of the sealing member is damaged, consumption speed of the lubricant is accelerated so that an internal abrasion occurs between the pins and the bushes to damage the pins or bushes. As a result, the function of the link chain is lost in a short period. Thus, the links and the pins are fixed to each other by a strong press-fit in order to prevent the link and the pin from being moved in their axial direction by an external force. Furthermore, there has been employed a mechanism for preventing the pins from coming out of the link.

As this pin-coming-out preventing mechanism, for example, Japanese Patent Application Publication No. 5-79548 discloses a link-and-pin fixing structure.

In this conventional fixing structure, each link is provided with an annular socket having a diameter-expanding slope surface directed outward in the axial direction, at an outside end face of a pin-press-fit hole. An exposed end portion of the pin has an annular groove dented smoothly inward in the axial direction of the link from its end face. Thus, when the pin is pressed into the pin-press-fit hole of each link, there is formed an annular hollow portion having an opening inclined outward between the groove in the pin and the socket of the link.

Then, an annular pressing-in retainer for preventing come-out of the pin, which is made of metallic material, is pressed into the annular hollow portion through its opening between the pin-press-fit hole in the link and the exposed end portion of the pin. The pressing-in retainer is plastically deformed along an inner wall of the hollow portion so that the hollow portion is filled with the retainer. By employing this slip-out preventing mechanism, there is an advantage that a moving of the pin in its axial direction can be suppressed.

Meanwhile, when a joint composed of the link and the pin is repaired, the pin is pushed out from the end portion of each link and the pressing-in retainer is cut out. Then, the cut-out pressing-in retainer is taken out of the hollow portion. Next, an end portion of the pin is press-fitted into the pin-press-fit hole of the link and a new pressing-in retainer is brought into the opening of the hollow portion. Consequently, the hollow portion is filled with the new pressing-in retainer similarly to above.

However, according to the above described Japanese Patent Application Publication No. 5-79548, the annular pressing-in retainer is pressed into the annular hollow portion as being plastically deformed so that the hollow portion is filled with the deformed pressing-in retainer. Thus, the pressing-in retainer needs to be filled securely between a surface of the groove in the pin and an inner face of the socket of the link. That is, if the filled annular pressing-in retainer is not fitted locally between the groove surface of the pin and the inner face of the socket of the link, it is easily peeled off. Consequently, a holding force of the pin in the axial direction is decreased to make the pin loose easily. Thus, durability cannot be expected.

Therefore, a complicated machining, a high dimensional precision and the like are required. Further, it is necessary to adjust positions of the socket of the link and the groove in the pin accurately, which requires more equipment cost, production cost and the like, as well as strict quality control. However, it is impossible to visually check an internal shape of the deformed and filled pressing-in retainer in the hollow portion. Therefore, not only in assembling of the link and the pin, but also in an inspection after the assembling work, it is not possible to see whether or not the deformed pressing-in retainer is fitted securely to the wall of the hollow portion. Thus, quality of products can not be uniform, and defective products are often produced.

SUMMARY OF THE INVENTION

The present invention has been accomplished to solve the above-described conventional problems. An object of the present invention is to provide a link-and-pin fixing structure of a crawler chain that makes it possible to fix the link and the pin to each other securely and firmly and secure a holding force for holding the pin sufficiently in its axial direction. Further, the present invention has an object to produce a link-and-pin fixing structure of a crawler chain that allows assembling of the link and the pin to be carried out easily at a low cost.

The above-described object is achieved effectively by following features of the present invention.

Firstly, according to the present invention, there is provided a link-and-pin fixing structure of a crawler chain, wherein a fitting space having an annular opening, in which an elastic ring whose diameter of a section is D is to be fitted, is formed between an opening end portion of a pin-press-fit hole of a link and a press-fit end portion of a pin exposed in the opening end portion; a link inner wall of the fitting space is formed with an tapered inner-diameter face whose diameter gradually decreases as it goes toward an inmost of said fitting space such that the tapered inner-diameter face intersects an axial line of the pin at a predetermined angle α; an outer peripheral face of the exposed end portion of the pin exposed in the fitting space is formed with an tapered outer-diameter face whose diameter gradually decreases as it goes toward the inmost of said fitting space such that the tapered outer-diameter face intersects the axial line of the pin at a predetermined angle β; said tapered inner-diameter face intersects an inner-diameter surface of said pin-press-fit hole at said angle α via an inner annular face continuous to said tapered inner-diameter face, and said tapered outer-diameter face intersects said inner-diameter surface of said pin-press-fit hole at said angle β via an outer annular face continuous to said tapered outer-diameter face; and when dimensions of distances between each contact points of the tapered inner-diameter face and the tapered outer-diameter face in the fitting space and a horizontal line passing the center of the section of the elastic ring are d1 and d2 respectively, the dimensions d1 and d2, the diameter D of the section of the elastic ring and the angles α and β have a relation as follows; α>β, D>d1+d2 (where d1=D/2·cos α, d2=D/2·cos β).

That is, according to the present invention, the annular fitting space is formed between an inner face of the opening end portion of the pin-press-fit hole of the link and the exposed end portion of the pin, and the elastic ring having a section of the diameter D can be fitted in this fitting space. An inner wall face of the link in this fitting space has an tapered inner-diameter face whose diameter gradually decreases as it goes toward the inmost of the fitting space such that the tapered face intersects the center of the pin-press-fit hole in the link at the predetermined angle α.

On the other hand, an outer peripheral face of the pin exposed in the fitting space has an tapered outer-diameter face whose diameter gradually increases as it goes toward an opening side of the fitting space such that the tapered face intersects its axis at the predetermined angle β. At a deep position in the fitting space, the tapered outer-diameter face and tapered inner-diameter face intersect each other via the respective annular faces continuous thereto. Such a fitting space is so constructed that the dimension of its opening is larger than the diameter D of the elastic ring's section and narrowed gradually as it goes from the opening end toward the inmost of the fitting space.

Thus, the elastic ring is fitted to the pin end portion through the opening of the fitting space in a state that it is expanded more than it normally is. Then, while holding the tapered outer-diameter face of the pin elastically, the elastic ring is pressed into the fitting space along the tapered outer-diameter face as it decreases the tightening force gradually.

When the elastic ring is fitted in the fitting space, each of lines (radius of the elastic ring's section, D/2) connecting the contact positions of the respective tapered faces with the center of the elastic ring's section forms a predetermined angle with respect to a perpendicular line passing the center of the elastic ring's section. Each of the angles α and β is respectively the same as the angle α formed by the tapered inner-diameter face of the link and the angle β formed by the tapered outer-diameter face of the pin as mentioned above.

According to the present invention, the contact point between the elastic ring and the tapered inner-diameter face of the link when the ring is fitted is located within a ¼ circle in the fourth quadrant of the elastic ring's section, in order to set up a preferred fixing structure for the link and the pin by the elastic ring. The contact point between the elastic ring and the tapered outer-diameter face is on the other hand located within a ¼ circle in the second quadrant of the elastic ring's section. Thus, a preferable fixing structure of the link and the pin with the elastic ring according to the present invention can be set.

Then, the angle α, which is formed by the line (radius (D/2)) passing the contact point between the ring and the tapered inner-diameter face of the link when the elastic ring is fitted and the perpendicular line passing the center of the ring's section, is set to be larger than the angle β, which is formed by a line (radius (D/2)) passing the contact point of the tapered outer-diameter face of the pin with the ring when the ring is fitted and the center of the elastic ring's section and the perpendicular line passing the center of the ring. Further, according to the present invention, the diameter D of the elastic ring's section is set to be larger than a sum of d1 and d2, which are dimensions from the respective contact points between the elastic ring and the respective tapered faces to the horizontal line passing the center of the elastic ring's section.

According to the present invention, with the above described structure, the elastic ring is brought into the fitting space along the tapered outer-diameter face of the pin while decreasing the tightening force of the ring such that the ring contacts with the outer and inner tapered faces in the fitting space at the respective predetermined positions. Thus, the elastic ring can be fitted easily between the respective tapered faces by a relatively small pressing force.

If the elastic ring is pressed between the respective tapered faces, the respective tapered faces are given with a force pressing the elastic ring toward the inmost of the fitting space based on the tightening force of the elastic ring. Thus, even if a fitted posture of the elastic ring in the fitting space is varied, the posture of the elastic ring is corrected in the fitting space so that the elastic ring can be fitted and fixe therein firmly.

If an external force in the axial direction is applied to the link or the pin, a force directed in an opposite direction along the tapered face is applied to a contact position between the tapered face and the elastic ring. At the same time, the tightening force of the elastic ring acts on the tapered outer-diameter face. The direction of the tightening force at this time is vertical to the tapered outer-diameter face. Therefore, the force directed toward the inmost of the fitting space along the tapered outer-diameter face is a sum of a component force of the external force along the tapered outer-diameter face and a component force of the tightening force of the elastic ring along the tapered outer-diameter face.

On the other hand, as described above, the elastic ring keeps contacting with the respective tapered faces in the fitting space with a relation of α>β with respect to the perpendicular line passing the center of its section. Thus, the component force directed toward an entrance of the fitting space along the tapered inner-diameter face of the link based on the aforementioned external force is smaller than the sum of the aforementioned component forces applied along the tapered outer-diameter face.

Consequently, even if an external force in the axial direction is applied to the link or the pin, the elastic ring is always pressed toward the inmost of the fitting space, so that the elastic ring never comes out of the fitting space. Further, even if the external force in the axial direction increase, the aforementioned component force generated along the tapered outer-diameter face of the pin also increases. Consequently, a large force to press the elastic ring toward the inmost of the fitting space is applied, so that the elastic ring is urged to go deeper in the fitting space by itself. Consequently, the elastic ring is retained more firmly in the fitting space.

That is, according to the present invention, when the external force in the axial direction is applied to the link or the pin, the force for pressing the elastic ring deeper in the fitting space is always larger than the force for pressing it out. Thus, the fitting force of the elastic ring is automatically intensified, so that the moving of the link or the pin in the axial direction can be prevented securely, whereby no looseness occurs. Thus, even if an impact in the axial direction is applied to the link or the pin, deformation, damage or the like of a lubricant-sealing member and its crush-preventing spacer disposed in a joint portion of the respective links can be prevented so that sufficient durability of the link chain is secured.

Further, according to the present invention, there is provided a typical structure that can achieve the same effects as mentioned above only by placing the elastic ring into the fitting space.

Specifically, there is provided a link-and-pin fixing structure for a traveling crawler chain, in addition to the above-described structure, wherein a contact position of the elastic ring with said tapered outer-diameter face in said fitting space when said elastic ring is fitted therein is located within a region of said tapered outer-diameter face extended in the axial direction.

With such a structure, only by placing the elastic ring into the region of the tapered outer-diameter face of the pin in the fitting space, the elastic ring contacts thereto in the fitting space with an appropriate tightening force. Therefore, further to the aforementioned effects of the present invention, the elastic ring can be fixed easily and firmly between the respective tapered faces in the fitting space.

Furthermore, according to the present invention, it is preferable that said elastic ring is a C-shaped ring made of an annular metallic material whose part is cut out and having an inside diameter smaller than a diameter of a narrowed portion of said press-fit end portion of the pin.

That is, the inside diameter of the elastic ring is set to be smaller than the outside diameter of the tapered outer-diameter face of the pin in the fitting space. Thus, if the elastic ring is fitted in the fitting space, a force directed toward the inmost of the fitting space is applied to the elastic ring by the tightening force of the elastic ring. Consequently, only by placing the elastic ring into the fitting space, the elastic ring can be set easily at an appropriate position that contacts with the tapered inner-diameter face of the link and the tapered outer-diameter face of the pin.

Still further, according to the present invention, it is preferable that of the respective annular faces continuous to said tapered outer-diameter face and said tapered inner-diameter face, at least the outer annular face continuous to the tapered outer-diameter face is curved in the axial direction so as to be dented.

If a switching portion between the tapered outer-diameter face and the outer annular face is formed linearly at a predetermined angle, there is a possibility that a crack or the like occur at the switching portion when an external shock is applied thereto after the pins and links are fixed to the elastic ring. According to the present invention, because the switching portion is formed in a curved face so as to be dented, any possible occurrence of the crack or the like can be avoided. Furthermore, when the elastic ring is fitted in the fitting space, the ring face-contacts with part of the outer annular face curved to be dented. Thus, the fitting position of the elastic ring can be fixed. Consequently, in addition to the aforementioned function according to the present invention, a stabilized fixing function for the pin and link can be exerted.

DESCRIPTION OF EMBODIMENTS

Hereinafter, embodiments of the present invention will be described in detail with reference to the accompanying drawings.

Figure 1:
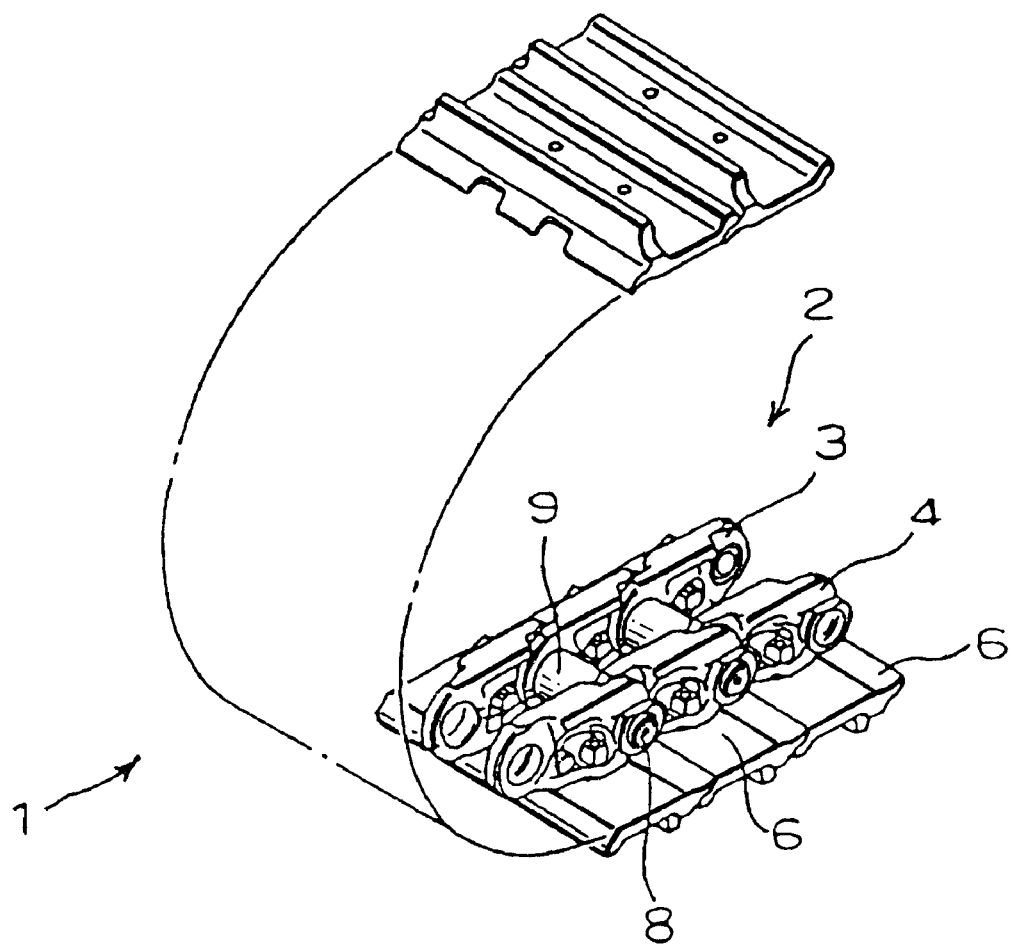
FIG. 1 is a structural view showing part of a link chain having a fixing structure of links and pins in a crawler chain of the present invention.
Figure 2:
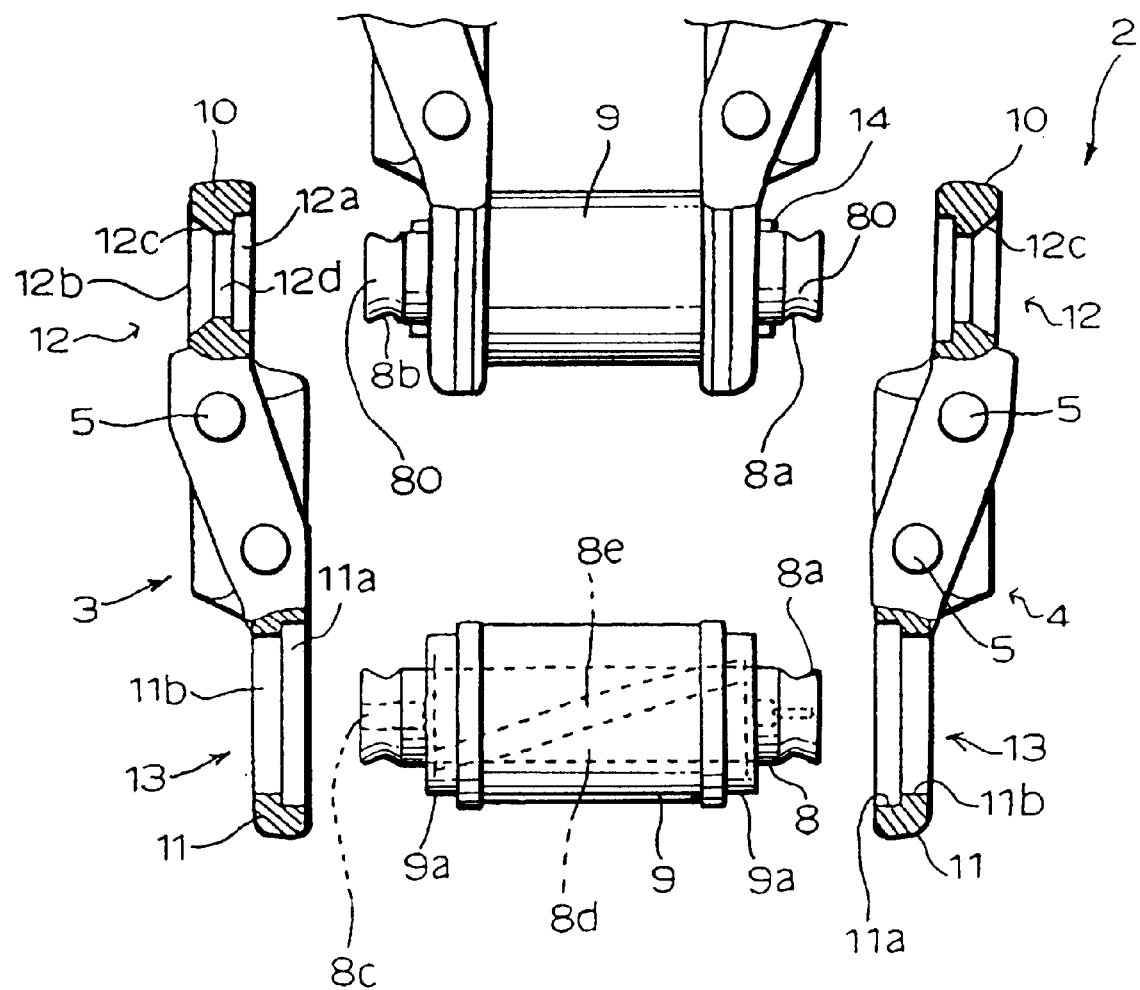
FIG. 2 is a partially broken exploded view showing the link chain partially disassembled.
Figure 3:
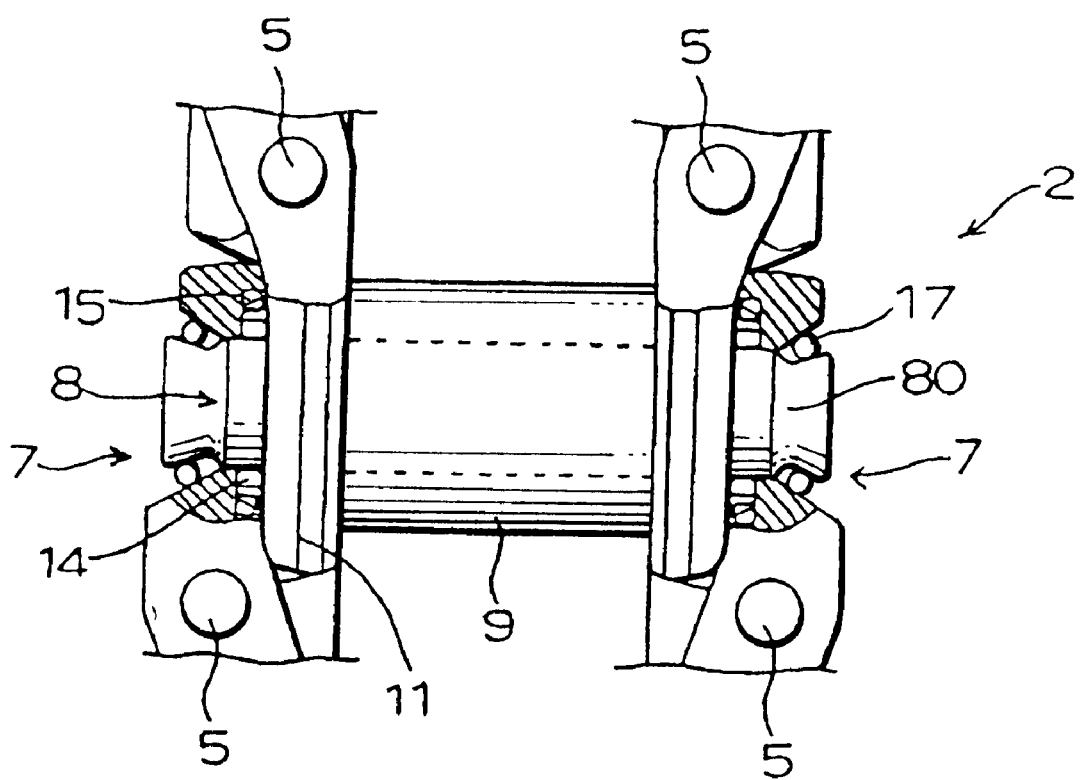
FIG. 3 is a structural view showing a part of the link-and-pin-fixing structure, partly in cross section.
Figure 4:
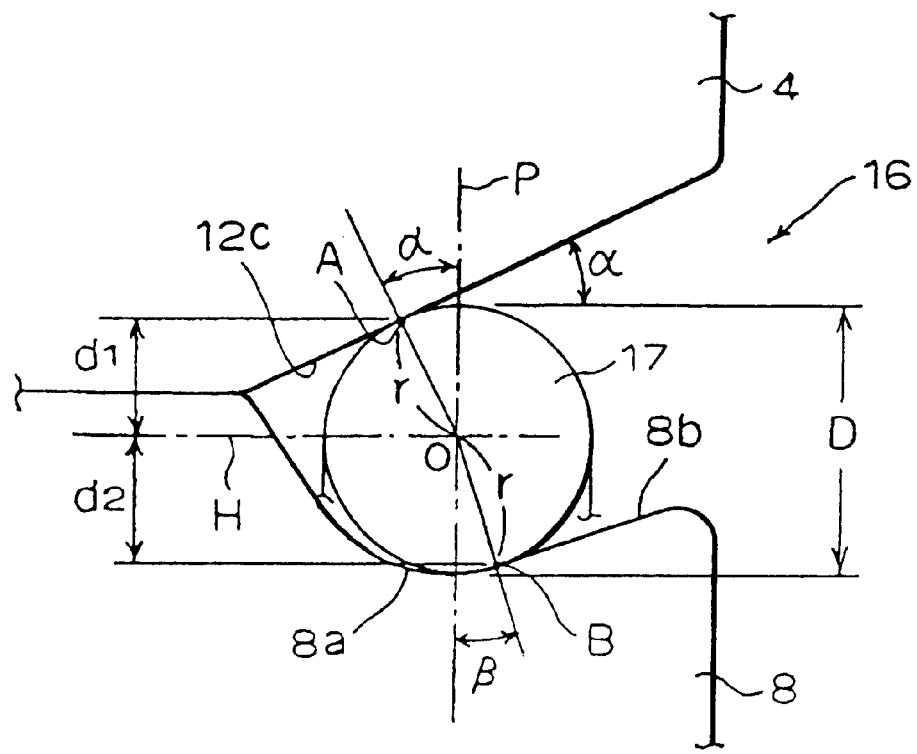
FIG. 4 is a structural diagram showing contact positions at the time when an elastic ring is fitted to the link and the pin.

FIG. 1 is a structural view showing part of a link chain having a fixing structure of links and pins in the crawler chain of the present invention. FIG. 2 is a partially broken exploded view showing the link chain partially disassembled. FIG. 3 is a structural view showing a part of the link-and-pin-fixing structure, partly in cross section. FIG. 4 is a structural diagram showing contact conditions at the time when an elastic ring is fitted to the link and the pin In FIG. 1, reference numeral 1 denotes a crawler chain of crawler-type vehicle for construction machine, transportation machine or the like. The crawler chain 1 is rotatably wound around traveling drive wheels (not shown) comprised of idler wheels disposed at a front part of the crawler-type vehicle, sprocket wheels disposed at a rear part thereof and track wheels disposed in a center part thereof. An endless link chain 2 is composed pairs of left and right links 3 and 4, which are joined to each other in an articulated manner. As shown in FIGS. 2 and 3, the links 3 and 4 have track-shoe-mounting holes 5, to which plural track shoes for ground contact are bolted. The aforementioned crawler chain 1 is thus constructed with the track shoes 6 and the link chain 2.

As shown in FIGS. 2 and 3, the aforementioned link chain 2 is composed of a link assembly, which are jointed with plural joint portions 7 in an articulated manner. The link assembly comprises a pair of sheet-like left and right links 3 and 4, which are symmetrical to each other and constitutes a feature of the present invention, a pin 8, which is also a feature of the present invention, for jointing the links 3, 4, a cylindrical bush 9 fitted onto each pin 8 for sealing, and an elastic ring 17, which is also a feature of the present invention, for preventing the aforementioned pin 8 from coming out. The links 3 and 4 are bent inwardly and outwardly, to form parallel end portions 10 and 11 at both end portions thereof, exclusive center portions thereof. A length of each pin 8 is set to have substantially the same dimension as or a shorter dimension than a width between the left and right links 3 and 4. The bush 9 has press-fit portions 9a at both side ends of thereof to be pressed into each link 3, 4. Each press-fit portion 9a has a smaller diameter than an outside diameter of the bush 9.

As shown in these Figures, the end portion 10 bent outward of each of the links 3 and 4 is a pin-press-fit end portion into which the pin 8 is to be pressed, whereas the other end portion 11 bent inward of each of the links 3 and 4 is a bush-press-fit end portion into which the press-fit portion 9a of the bush 9 is to be pressed. A pin-press-fit hole 12 is formed in the pin-press-fit end portion 10 of each of the links 3 and 4, while a bush-press-fit hole 13 is formed in the bush-press-fit end portion 11 of each of the links 3 and 4. A back-to-forth length of the pin-press-fit end portion 10 of each of the links 3 and 4 is formed to be shorter than the corresponding length of the bush-press-fit end portion 11. Tip ends of each pair of these end portions 10 and 11 are formed in substantially semi-circular shapes respectively.

According to this embodiment, an inner end side of the pin-press-fit hole 12 of each of the links 3, 4 is formed with a pin hole 12a, on which a sealing member 14 for sealing lubricant reserved inside the pin 8 and a spacer 15 for preventing a crash of the sealing member 14 are mounted coaxially. An outer end side of the pin-press-fit hole 12 is on the other hand formed with a pin-end-portion-fitting hole 12d having an tapered inner-diameter face 12c whose diameter gradually decreases inward of an opening end portion 12b of the pin-press-fit hole 12. There is a step portion between the pin hole 12a and the pin-end-portion-fitting hole 12a. The tapered inner-diameter face 12c of the opening end portion 12b of the pin-press-fit hole 12 intersects an inner-diameter surface of the pin-press-fit hole 12 via an annular face 12e. As shown in FIG. 4, the tapered inner-diameter face 12c is inclined so as to narrow toward a central axial line of the pin-press-fit hole 12 at an angle α with respect to the axial line.

On the other hand, as shown in FIG. 2, the bush-press-fit hole 11 of each of the links 3 and 4 has an engaging hole 11a for engaging with a bush 9, and a bush-press-fit hole 11b having a smaller diameter than the engaging hole 11a as shown in FIG. 2. The pin 8 is pressed and fixed to the bush 9 such that it is exposed outside. Consequently, a pin/bush assembly is completed. The bush 9 is pressed in and fixed to the bush-press-fit hole 13 of each of preceding links 3 and 4. Then, the pin 8 is pressed into the pin-press-fit hole 12 of each of subsequent links 3 and 4.

An exposed end portion 80 of the pin 8 has an tapered outer-diameter face 8b whose diameter gradually decreases toward an axial line of the pin 8 from an exposed end face thereof. The tapered outer-diameter face 8b is inclined at an angle β with respect to the axial line of the pin 8, as shown in FIG. 4. The tapered outer-diameter face 8b is extended to an outer peripheral face of the pin 8 via an annular face 8a having a predetermined sectional shape, while its diameter increases. The inclination angle β of the tapered outer-diameter face 8b at a pin end portion is set to be smaller than the inclination angle α of the tapered inner-diameter face 12c at an opening end portion 12b of each of the links 3 and 4 (α>β).

An oil-supply port 8c for supplying lubricant is formed at the center of one end of the pin 8. A lubricant reservoir 8d is formed on an axis of the pin 8 so as to communicate with the oil-supply port 8c. The lubricant reservoir 8d communicates with the outer peripheral face of the pin 8 via a lubricant passage 8e, so that the lubricant is supplied to an inner peripheral face of the bush 9. A lubricant-sealing plug (not shown) seals the oil supply port 8c.

Figure 5:
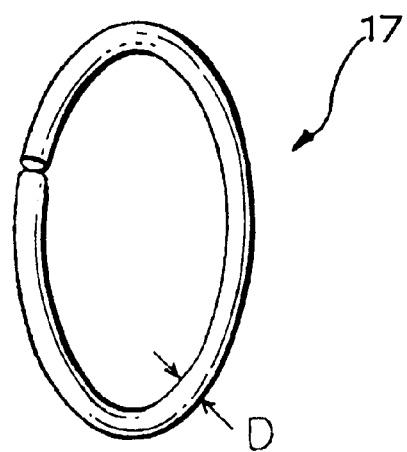
FIG. 5 is a perspective view of the elastic ring.

With such a structure of the links 3 and 4, and the pin 8 for a traveling crawler chain 1 of a vehicle, a fixing structure of the links 3 and 4 and the pin 8 with the elastic ring 17 can work in a preferable manner. As shown in FIG. 4, a fitting space 16 having an annular opening, which is a characteristic part of the present invention, is formed between an inner face of the opening end portion 12b of the pin-press-fit hole 12 and the exposed end portion 80 of the pin 8 exposed in the opening end portion 12b. The elastic ring 17 having a sectional diameter of D is to be fitted in the fitting space 16 as shown in FIG. 5.

The link inner face in the fitting space 16 is formed with the tapered inner-diameter face 12c whose diameter gradually decreases as it goes inward such that it intersects the axis of the pin 8 at the predetermined angle α as described above. This link inner face is joined to an inner peripheral face of the pin-press-fit hole 12 of each of the links 3 and 4, via the inner annular face 12e continuous to the tapered inner-diameter face 12c. On the other hand, the exposed end portion 80 of the pin 8 in the fitting space 16 is formed with an tapered outer-diameter face 8b whose diameter gradually decreases as it goes inward such that it intersects the axis of the pin 8 at the predetermined angle β as described above, and further has an outer face extended to intersect the tapered inner-diameter face 12c of each of the links 3 and 4 via the annular face 8a continuous to the tapered outer-diameter face 8b.

According to the present invention, in order to secure an appropriate fixing structure with the respective links 3 and 4, the pin 8 and the elastic ring 17, a contact point between the elastic ring 17 and the tapered inner-diameter face 12c of the link at the time of fitting is set to be within a ¼ circle in the fourth quadrant of the elastic ring's section. On the other hand, a contact point between the tapered outer-diameter face 8b of the pin 8 and the ring 17 is within a ¼ circle in the second quadrant of the elastic ring's section. When the elastic ring 17 is fitted in the fitting space 16, it keeps contacting with predetermined contact positions of the respective tapered faces 8b and 12c in the fitting space 16.

As shown in FIG. 4, an angle, which is determined by a line passing a contact position A of the tapered inner-diameter face 12c with the elastic ring 17 in the fitting space 16 and a center O of a section of the elastic ring 17 and by a perpendicular line P passing the center O of the section of the elastic ring 17, is the angle α determined by the tapered inner-diameter face 12c of the link. On the other hand, an angle, determined by a line passing a contact point B of the tapered outer-diameter face 8b with the elastic ring 17 in the fitting space 16 and the center O of the elastic ring's section and by the perpendicular line P passing the center O of the section of the elastic ring 17, is the angle β determined by the tapered outer-diameter face 8b of the pin 8.

According to the present invention, a relation between the angle α and the angle β is α>β as described above. Therefore, Dimensions d1 and d2 are the respective lengths between the respective contact points A and B on the tapered faces 8b and 12c and a horizontal line H passing the center O of the section of the elastic ring 17. Therefore, the diameter D of the elastic ring's section and the respective dimensions d1 and d2 have a relation of D>(d1+d2). As shown in FIG. 4, the dimensions d1 and d2 are respectively d1=(D/2·cos α), d2=(D/2·cos β). Thus, an opening dimension of the fitting space 16 is provided to be larger than the diameter D of the elastic ring 17, so that an interior of the fitting space 16 is formed to be narrowed gradually from the opening end toward the axis.

The elastic ring 17 to be fitted into the fitting space 16 is made of an annular elastic metallic material, which is partly is cut out as shown in FIG. 5, in a shape of round-steel C-shaped ring which can be fitted freely to the tapered outer-diameter face 8b of the pin 8. An inside diameter of the ring 17 is set to be smaller than a diameter of the smallest portion of the exposed end portion 80 of the pin 8. The elastic ring 17 is brought into the fitting space 16 through an opening thereof in a state that the ring 17 is kept expanded more than it naturally is. If the elastic ring 17 is brought into the fitting space 16, it tries to move toward an inmost of the fitting space 16 along the tapered slope of the tapered outer-diameter face 8b of the pin 8 by a tightening force of the elastic ring 17.

As a result, the elastic ring 17 is pressed deeply into the fitting space 16 easily along the slope of the tapered outer-diameter face 8b of the pin 8. At the same time, even if the elastic ring 17 is pressed in an improper posture, the posture of the elastic ring 17 is automatically corrected by an elastic force of the elastic ring 17 due to a tightening force applied in the tightening direction of the elastic ring 17. Consequently, the tightening force of the elastic ring 17 is applied equally to an entire periphery of the tapered outer-diameter face 8b of the pin 8. As described above, the elastic ring 17 can be fitted between the respective tapered faces 8b and 12b in the fitting space 16 easily with a relatively small pressing force. Thus, the elastic ring 17 can be set at a proper contact position on the tapered inner-diameter face 12c of each of the links 3 and 4 and the tapered outer-diameter face 8b of the pin 8.

Figure 6:
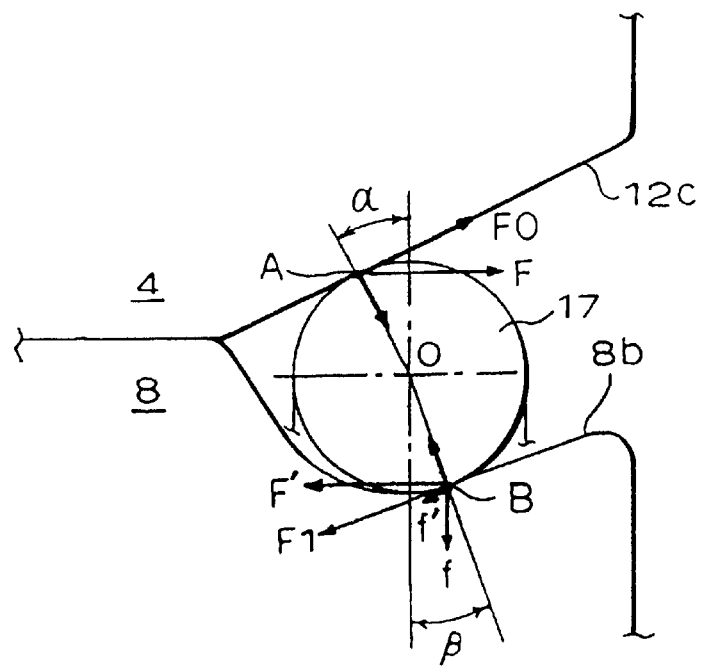
FIG. 6 is a diagram showing a relation of the force to the elastic ring of the link and the pin.

FIG. 6 shows a relation of forces of the link 4 and the pin 8 with respect to the elastic ring 17. When an external force F or F' is applied to the link 4 or the pin 8 in an axial direction, for example, forces F0 (F0=F cos α) and F1 (F1=F' cos β), which are directed in opposite directions to each other, are applied to the contact positions A and B of the tapered faces 8b and 12c with the elastic ring 17 along the respective tapered faces 8b and 12c. At the same time, the tightening force f of the elastic ring 17 is applied to the tapered outer-diameter face 8b of the pin 8 also. Here, F≈F' and α>β.

At this time, the tightening force f of the elastic ring 17 applied to the tapered outer-diameter face 8b acts in a perpendicular direction to the tapered outer-diameter face 8b. Therefore, a force directed to an inmost of the fitting space 16 along the tapered outer-diameter face 8b contains a sum of a component force F1 applied along the tapered outer-diameter face 8b and a component force f' (f'=f sin β) of the tightening force f applied along the tapered outer-diameter face 8b.

On the other hand, as described above, the elastic ring 17 keeps contacting with the respective tapered faces 8b and 12c in the fitting space 16 with a relation of the angles α>β with respect to the perpendicular line P passing the center O of the section of the ring 17. Therefore, the component force F0 applied toward the entrance of the fitting space 16 along the tapered inner-diameter face 12c of the link 4 based on the aforementioned external force becomes smaller than the sum of the component forces F1 and f' applied along the tapered outer-diameter face 8b (F0<F1+f').

With such a structure, even if an external force in the axial direction is applied to the link 4 or the pin 8, the forces are applied in such a manner that the elastic ring 17 is always pressed toward the inmost of the fitting space 16, so that it never comes out of the fitting space 16. Furthermore, even when the external force F or F' in the axial direction increases, the component force F1 generated along the tapered outer-diameter face 8b of the pin 8 increases. Consequently, such a large force is applied to the elastic ring 17 that presses the elastic ring 17 deeper into the fitting space 16. Thus, the elastic ring 17 tries to move toward the inmost of the fitting space 16 by itself, so that its pressing forces to the respective tapered faces 8b and 12c increase. Thereby, the elastic ring 17 is retained further firmly in the fitting space 16.

According to the present invention, when the external forces in the axial direction are applied to each of the links 3 and 4 and the pin 8, the force which presses the elastic ring 17 deeper into the fitting space 16 becomes larger than the force that presses it out. Consequently, the elastic ring 17 can intensify its fitting force by itself securely, thereby preventing the links 3 and 4 and the pin 8 from moving in the axial direction. Therefore, a required force for holding the pin 8 in the axial direction can be obtained, and the link 4 can be protected.

Furthermore, according to the present invention, in addition to the above described feature, not only the elastic ring 17 can be brought into the respective regions of the tapered faces 8b and 12c in the fitting space 16, but also a stabilized fitting structure for the elastic ring 17 can be applied. FIG. 4 shows a typical example of that structure. In this example, of the respective annular faces continuous to the tapered outer-diameter face 8b and the tapered inner-diameter face 12c, at least a part of the outer annular face 8a continuous to the tapered outer-diameter face 8b is curved in the axial direction so as to be dented.

With this structure, the part of the outer annular face 8a is formed with a dented curved face, which is continuous to the tapered outer-diameter face 8b at a predetermined angle. If this annular face is formed to be such a truncated cone shape that intersects the tapered outer-diameter face 8b at a predetermined angle, a crack or a similar defect would possibly occur at a connecting portion between the tapered outer-diameter face 8b and the annular face when an external impact is applied, after the pin 8 and the links 3, 4 are fit with the elastic ring 17. According to this embodiment, on the other hand, because the annular face is a dented curved face, not only an occurrence of the crack can be avoided, but also when the elastic ring 17 is brought into the fitting space 16, the elastic ring 17 can face-contact with part of the outer annular face 8a which is curved and dented. Thus, even if a large impact is applied, the fitting position of the elastic ring 17 is moved slightly deeper in the fitting space 16 so that it is fixed firmly. Thus, a stabilized fixing function for the pin 8 and the links 3 and 4 can be exerted.

Figure 7:
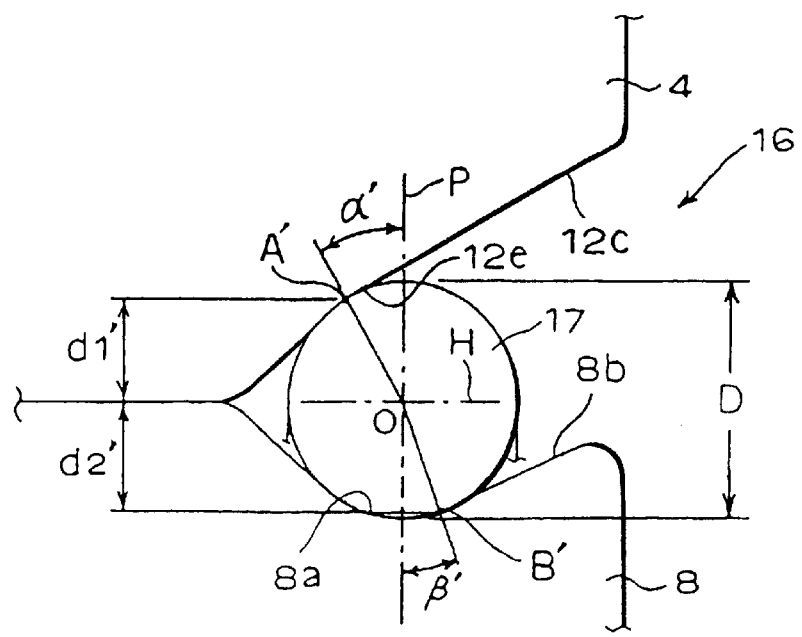
FIG. 7 is a diagram showing another example of the link-and-pin fixing structure.

FIG. 7 shows another example of the fixing structure of the tapered faces 8b and 12c and the elastic ring 17 when the elastic ring 17 is fitted in the fitting space 16. As shown in the Figure, the tapered inner-diameter face 12c in the fitting space 16 is formed with an annular face 12e curved at the same curvature as that of the outer peripheral face of the elastic ring 17. On the other hand, the outer annular face 8a curved so as to be dented, which extends continuously from the tapered outer-diameter face 8b in an opposite direction in the fitting space 16, is formed at substantially the same curvature as that of the outer peripheral face of the elastic ring 17.

As shown in the Figure, part of the outer peripheral face of the elastic ring 17 located on the side of the tapered inner-diameter face 12c of each link 3, 4 keeps face-contacting with the annular face 12e. A center A' of the curve of the annular face 12e is located within the fourth quadrant of the elastic ring's section with respect to the center O of the elastic ring's section. A line passing the center A' and the center O extends at a predetermined angle α with respect to the perpendicular P passing the center O.

On the other hand, part of the outer peripheral face of the elastic ring 17 located on the side of the tapered outer-diameter face 8b of the pin 8 keeps face-contacting with the annular face 8a through a contact starting point B' which is a bordering portion between the tapered outer-diameter face 8b and the annular face 8a. As described previously, a line passing through the contact position B' of the tapered outer-diameter face 8b of the pin 8 with the elastic ring 17 and the center O of the elastic ring's section has a predetermined angle β' with respect to the perpendicular P passing the center O. The contact position B' is located within the second quadrant of the elastic ring's section with respect to the center O.

A relation between dimensions d1' and d2', which are distances from the contact positions A' and B' on the respective tapered faces 8b and 12c in the fitting space 16 to the center O of the section of the elastic ring 17, the diameter D of the elastic ring's section and the angles α' and β' is the same as the example as described previously with reference to FIG. 4.

With such a structure, the annular face 12e continuous to the tapered inner-diameter face 12c and the annular face 8a continuous to the tapered outer-diameter face 8b in the fitting space 16 face-contacts with the elastic ring 17 such that they wrap part of the outer peripheral face of the elastic ring 17, when an external impact is applied in the axial direction. Consequently, the elastic ring 17 can be fitted in a stabilized posture and held firmly.

When the pin 8 and the links 3 and 4 are assembled with such a fixing mechanism of the elastic ring 17 and the pin 8 and links 3 and 4 according to the present invention, the pin 8 is in advance pressed in and fixed in the bush 9 such that both ends thereof are exposed in this embodiment as described above, thereby providing a pin/bush assembly. The bush 9 is then pressed into the bush-press-fit hole 13 of each of preceding links 3 and 4 and then the pin 8 is pressed into the pin-press-fit hole 12 of each of subsequent links 3 and 4. As such assembling process is repeated successively, a predetermined number of assemblies of the left and right links 3 and 4 are produced, whereby the link chain 2 is produced.

Next, the fixing operation of the links 3 and 4 and the pin 8 in the crawler chain 1 with the elastic ring 17 is carried out. In this embodiment, the pin 8 and links 3 and 4 are fixed to each other after plural pin/bush assemblies are pressed into the links 3 and 4 respectively and the assembling of the link chain 2 is completed. Alternatively, according to the present invention, it is permissible to carry out the fixing operation of the pin 8 and links 3 and 4 with the elastic ring 17 at the time each pin/bush assembly has been press-fitted into the respective pairs of preceding and subsequent left and right links 3 and 4.

After the assembly of the link chain 2 is completed, a fixing process for the link 3 and the pin 8 in the crawler chain 1 with the elastic ring 17 starts to be executed. First, the elastic ring 17 having a section whose diameter is D is positioned at an opening of the fitting space 16 having an annular opening formed between the pin-press-fit hole 12 of the link 3 and the exposed end portion 80 of the pin 8 by means of an elastic-ring-fitting jig (not shown). Next, the elastic ring 17 is brought into the fitting space 16 and pressed along the tapered outer-diameter face 8b of the pin 8, while the tightening force of the elastic ring 17 gradually decreases.

At this time, with the tightening force of the elastic ring 17, a force toward the inmost of the fitting space 16 is always applied to the elastic ring 17, which is at the same time pressed along a downward slope of the tapered face 8b in the fitting space 16. Thus, the outer peripheral face of the elastic ring 17 face-contacts with the respective tapered faces 8b and 12c. As described above, only by placing the elastic ring 17 into the fitting space 16, it is possible to set the ring 17 easily at an appropriate position where it keeps contacting with the tapered inner-diameter face 12c of each link 3 and the tapered outer-diameter face 8b of the pin 8.

Next, the fixing operation of the link 4 and the pin 8 with the elastic ring 17 is carried out in the same manner as above and then, the fixing procedure is completed. After that, the preceding links 3 and 4 are fed out and then, the fixing procedure for the subsequent links 3 and 4 and the pin 8 is carried out.

After the fixing procedure for each of the links 3 and 4 is repeated successively, the fixing operation for fixing the links 3 and 4 and the pin 8 with the elastic ring 17 is completed. After the link chain 2 is thus completed, lubricant is supplied to the lubricant reservoir 8d through the oil-supply port 8c of each pin 8 in accordance with a conventionally known process. Then, the track shoes 6 are respectively mounted to the link chain 2 through the track-shoe-mounting holes 5 in the links 3 and 4 with mounting bolts (not shown), by using an impact wrench for mounting track shoes or the like (not shown). Consequently, the crawler chain 1 is completed.

According to the present invention, in fixing the links 3 and 4 and the pin 8 with the elastic ring 17, if the elastic ring 17 is brought into the fitting space 16, a force toward the inmost of the fitting space 16 is naturally applied to the elastic ring 17 because of the tightening force of the elastic ring 17. Therefore, only by placing the elastic ring 17 into the fitting space 16, it is possible to set the ring 17 at a predetermined position appropriately between the tapered inner-diameter face 12c of each of the links 3 and 4 and the tapered outer-diameter face 8b of the pin 8. As compared to the conventional art, a high dimensional precision and complicated machining or the like are not required for a target product. Furthermore, it is not necessary to adjust the positions of the links 3 and 4 and the pin 8 strictly accurately during the assembly.

As is evident from the above description, according to the fixing structure for the links 3, 4 and the pin 8 of the crawler chain 1 of the present invention, when an external force in a horizontal direction is applied to each link 3, 4 and the pin 8, such a large force is applied to the elastic ring 17 that the elastic ring 17 is pressed toward the inmost of the fitting space 16 by the respective tapered faces 8b, 12c. At the same time, a force, which is generated in a pin-tightening direction by the elastic ring 17, acts inward of the fitting space 16, thereby blocking a force to pull the elastic ring 17 out of the fitting space 16. Thus, the elastic ring 17 can be held firmly in the fitting space 16.

Even if each link 3, 4 or the pin 8 receives a strong impact in the axial direction, a fitting force of the elastic ring 17 is automatically intensified because a force of pressing the elastic ring 17 toward the inmost of the fitting space 16 is always larger than a force of pressing it out. Consequently, moving of the link 3, 4 or the pin 8 in the axial direction can be prevented securely. Furthermore, it is possible to secure a required holding force of the pin 8 in its axial direction, so that the links 3 and 4 can be also protected. Thus, deformation, damage and the like of the lubricant-sealing member 14 and the crush-preventing spacer 15 disposed in the joint portion of each link 3, 4 can be prevented so that durability of the link chain 2 can be secured sufficiently. Meanwhile, the present invention is not restricted to the above described embodiments, and needless to say, includes a technical scope that can be obtained by those skilled in the art who can modify these embodiments easily.

What is claimed is:

1. A link-and-pin fixing structure for a traveling crawler chain of a vehicle, wherein:

a fitting space having an annular opening, in which an elastic ring whose diameter of a section is D is to be fitted, is formed between an opening end portion of a pin-press-fit hole of a link and a press-fit end portion of a pin exposed in said opening end portion;

a link inner wall of said fitting space is formed with an tapered inner-diameter face whose diameter gradually decreases as it goes toward an inmost of said fitting space such that said tapered inner-diameter face intersects an axial line of the pin at a predetermined angle $\alpha$;

an outer peripheral face of an exposed end portion of the pin exposed in said fitting space is formed with an tapered outer-diameter face whose diameter gradually decreases as it goes toward the inmost of said fitting space such that said tapered outer-diameter face intersects the axial line of the pin at a predetermined angle $\beta$;

said tapered inner-diameter face intersects an inner-diameter surface of said pin-press-fit hole at said angle $\alpha$ via an inner annular face continuous to said tapered inner-diameter face, and said tapered outer-diameter face intersects said inner-diameter surface of said pin-press-fit hole at said angle $\beta$ via an outer annular face continuous to said tapered outer-diameter face; and when dimensions of distances between each of contact points of the tapered inner-diameter face and the tapered outer-diameter face in said fitting space and a horizontal line passing a center of the section of said elastic ring are d1 and d2 respectively, said dimensions d1 and d2, the diameter D of the section of said elastic ring and said angles $\alpha$ and $\beta$ have a relation as follows;

$\alpha > \beta$, $D > d1 + d2$ where $d1 = D/2 \cdot \cos \alpha$, $d2 = D/2 \cdot \cos \beta$.

2. A link-and-pin fixing structure for a traveling crawler chain according to claim 1, wherein a contact position of the elastic ring with said tapered outer-diameter face in said fitting space when said elastic ring is fitted therein is located within a region of said tapered outer-diameter face extended in the axial direction.

3. A link-and-pin fixing structure for a traveling crawler chain according to claim 1, wherein said elastic ring is made of an annular metallic material whose part is cut out and has an inside diameter smaller than a diameter of a narrowed portion of said press-fit end portion of the pin.

4. A link-and-pin fixing structure for a traveling crawler chain according to claim 1, wherein of the respective annular faces continuous to said tapered outer-diameter face and said tapered inner-diameter face, at least the outer annular face continuous to the tapered outer-diameter face is curved in the axial direction so as to be dented.

* * * * *